(12) United States Patent
Kang et al.

(10) Patent No.: US 11,085,364 B2
(45) Date of Patent: Aug. 10, 2021

(54) INTERCOOLER ASSEMBLY

(71) Applicants: HYUNDAI MOTOR COMPANY, Seoul (KR); KIA MOTORS CORPORATION, Seoul (KR)

(72) Inventors: Seung Jae Kang, Seoul (KR); Won Rok Choi, Seoul (KR); Si Hyuk Ryu, Seongnam-si (KR); Hyun Jin Park, Incheon (KR); Seung Yeon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/855,200

(22) Filed: Apr. 22, 2020

(65) Prior Publication Data
US 2021/0148278 A1 May 20, 2021

(30) Foreign Application Priority Data
Nov. 19, 2019 (KR) .......................... 10-2019-0148923

(51) Int. Cl.
*F02B 29/04* (2006.01)
(52) U.S. Cl.
CPC ...... *F02B 29/0468* (2013.01); *F02B 29/0418* (2013.01); *F02B 29/0425* (2013.01)
(58) Field of Classification Search
CPC .............. F02B 29/0468; F02B 29/0418; F02B 29/0425
USPC .................................................. 123/542, 336
See application file for complete search history.

(56) References Cited

U.S. PATENT DOCUMENTS

| | | | | |
|---|---|---|---|---|
| 2002/0073977 A1* | 6/2002 | Craig | ................. | F02B 29/0456 123/556 |
| 2007/0039322 A1* | 2/2007 | Bering | ................. | F02M 26/15 60/599 |
| 2013/0000612 A1* | 1/2013 | Vigild | ................. | F02B 29/0418 123/563 |
| 2015/0027114 A1* | 1/2015 | Ino | ..................... | F02B 29/0475 60/599 |
| 2016/0222871 A1* | 8/2016 | Kemmerling | ....... | F02B 29/0425 |
| 2019/0264602 A1* | 8/2019 | Farhat | ................. | F02B 29/0493 |

FOREIGN PATENT DOCUMENTS

EP 1336736 A2 * 8/2003 .......... F02B 29/0418

* cited by examiner

*Primary Examiner* — Mahmoud Gimie
(74) *Attorney, Agent, or Firm* — Brinks Gilson & Lione

(57) ABSTRACT

An intercooler assembly includes: a cooler body having a heat exchanger; an upper tank formed at an intake air inlet connected to the heat exchanger and coupled to an upper portion of the cooler body; a lower tank coupled to the lower portion of the cooler body to form an intake air discharge part connected to the heat exchanger; a bypass unit connected to the intake discharge part separately from the intake inlet; and a valve unit connected to the intake air inlet and the bypass unit and selectively introducing intake air supplied through a turbocharger into the intake air inlet and the bypass unit.

5 Claims, 10 Drawing Sheets

INTERCOOLER ASSEMBLY

CROSS-REFERENCE TO RELATED APPLICATION

This application claims priority to and the benefit of Korean Patent Application No. 10-2019-0148923, filed on Nov. 19, 2019, the entire contents of which are incorporated herein by reference.

FIELD

The present disclosure relates to an intercooler assembly for a vehicle.

BACKGROUND

The statements in this section merely provide background information related to the present disclosure and may not constitute prior art.

Generally, an engine system of a vehicle is equipped with an exhaust gas recirculation (EGR) apparatus for recycling a part of the exhaust gas back to the intake line of the engine system.

The exhaust gas recirculation apparatus includes a High Pressure Exhaust Gas Recirculation (HP-EGR) unit for recirculating exhaust gas at the front end of the catalyst and a Low Pressure Exhaust Gas Recirculation (LP-EGR) unit for recirculating exhaust gas at the rear end of the catalyst.

In addition, the engine system is provided with an intercooler for cooling the intake air compressed by the turbocharger in the low-pressure easy unit, and supplying fresh air to the intake manifold.

However, in the intercooler as described above, in the process of cooling the intake air, saturated water vapor in the low-pressure easy gas is cooled and condensed water is generated. The condensate accumulates on the flow path of the intake air and interferes with the flow of the intake air, thereby lowering the intake suction efficiency of the intercooler and reducing the cooling area of the intercooler, thereby acting as a factor of lowering the cooling efficiency. Furthermore, the above condensate can freeze in winter during the intake of the intake flow path, causing cracks or breakage of the intake flow path.

The above information disclosed in this Background section is only for enhancement of understanding of the background of the present disclosure and therefore it may contain information that does not form the prior art that is already known to a person of ordinary skill in the art.

SUMMARY

The present disclosure provides an intercooler assembly that bypasses high temperature intake air to the intake air discharge side under cold low load conditions at winter start, and solves the condensate freezing problem at the intake air discharge side.

An intercooler assembly according to an exemplary form of the present disclosure includes: a cooler body having a heat exchanger, an upper tank formed at an intake air inlet connected to the heat exchanger and coupled to an upper portion of the cooler body; a lower tank coupled to the lower portion of the cooler body to form an intake air discharge part connected to the heat exchanger; a bypass unit connected to the intake discharge part separately from the intake air inlet; and a valve unit connected to the intake air inlet and the bypass unit and selectively introducing intake air supplied through a turbocharger into the intake air inlet and the bypass unit.

Further, in the intercooler assembly according to an exemplary form of the present disclosure, the valve unit may close the bypass unit under a high temperature and high load condition and open the intake air inlet.

Further, in the intercooler assembly according to an exemplary form of the present disclosure, the valve unit may open the bypass unit under low temperature and low load conditions and close the intake inlet.

In another exemplary form of the present disclosure, an intercooler assembly includes: a cooler body having a heat exchanger; an upper tank formed at an intake air inlet connected to the heat exchanger and coupled to an upper portion of the cooler body; a lower tank coupled to a lower portion of the cooler body to form an intake air discharge part connected to the heat exchanger; a bypass inlet unit which is integrally provided with an intake inlet unit through a valve mounting unit located outside of the upper tank and configured to form a passage that is partitioned separately from a passage of the intake inlet unit; a bypass conduit connecting the bypass inlet and the intake air discharge part; a valve housing having a main inlet connected to an intake inlet and the bypass inlet and mounted to the valve mounting unit; and a valve body assembly installed in the valve housing to selectively open and close a passage of the intake inlet and the bypass inlet by a driving force from an actuator.

Further, in the intercooler assembly according to an exemplary form of the present disclosure, the valve housing may form a first valve passage portion and a second valve passage portion connected to one main inlet portion.

Further, in the intercooler assembly according to an exemplary form of the present disclosure, the first valve passage portion may have a predetermined passage cross-sectional area and be connected with the intake air inlet.

Further, in the intercooler assembly according to an exemplary form of the present disclosure, the second valve passage portion may have a passage cross-sectional area different from that of the first valve passage portion and be connected to the bypass inlet.

Further, in the intercooler assembly according to an exemplary form of the present disclosure, the passage cross-sectional area of the second valve passage portion may be smaller than the passage cross-sectional area of the first valve passage portion.

Further, in the intercooler assembly according to an exemplary form of the present disclosure, a central axis of the first valve passage portion may be disposed closer to a central axis of the main inlet portion than the second valve passage portion.

Further, in the intercooler assembly according to an exemplary form of the present disclosure, the valve body assembly may include: a valve rotation shaft configured to traverse the first and second valve passage portions and connected to the actuator; a first valve body fixed to the valve rotation shaft in the first valve passage portion; and a second valve body fixed to the valve rotation shaft in the second valve passage portion.

Further, in the intercooler assembly according to an exemplary form of the present disclosure, the first and second valve bodies may be respectively provided in the form of a circular flap, and configured to rotate with the valve rotation shaft about a rotation axis of the valve rotation shaft.

Further, in the intercooler assembly according to an exemplary form of the present disclosure, the bypass conduit may include a condensate collector at a connection end connected to the intake air discharge part.

Exemplary forms of the present disclosure bypass the relatively high intake air intake to the discharge side of the intake under low temperature and low load conditions during winter start-up, and melt the ice block of condensate frozen in the intake discharge side as the intake. Therefore, it is possible to prevent cracking or breakage of the intake air flow path due to freezing of the condensate.

In addition, the effects that can be obtained or predicted by the forms of the present disclosure will be disclosed directly or implicitly in the detailed description of the forms of the present disclosure. That is, various effects predicted according to an form of the present disclosure will be disclosed in the detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
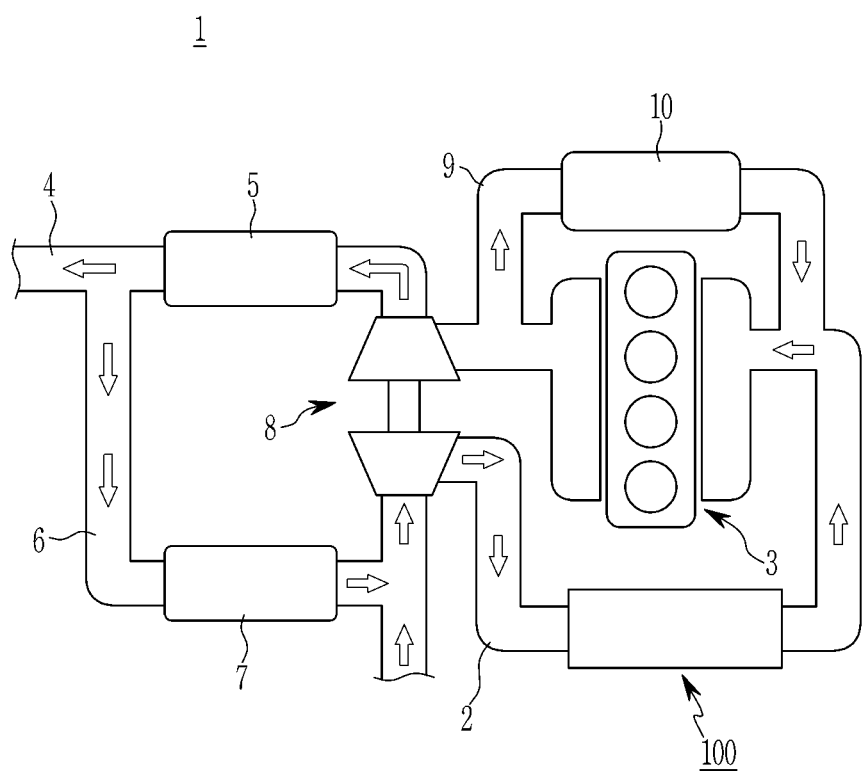
FIG. 1 is a block diagram illustrating an example of an engine system to which an intercooler assembly is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The unrelated parts to the description of the exemplary forms are not shown to make the description clear and like reference numerals designate like element throughout the specification.

Further, the sizes and thicknesses of the configurations shown in the drawings are provided selectively for the convenience of description, so that the present disclosure is not limited to those shown in the drawings and the thicknesses are exaggerated to make some parts and regions clear.

Discriminating the names of components with the first, the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

In addition, the terminology such as " . . . unit", " . . . means", " . . . part", or " . . . member", which is disclosed in the specification, refers to a unit of an inclusive constituent which performs at least one of the functions or operations.

FIG. 1 is a block diagram illustrating an example of an engine system to which an intercooler assembly according to an exemplary form of the present disclosure is applied.

Referring to FIG. 1, the intercooler assembly 100 according to an exemplary form of the present disclosure may be applied to the engine system 1 of a diesel vehicle.

For example, the engine system 1 may include: an intake line 2, an intercooler assembly 100, an engine 3, an exhaust line 4, a diesel particulate filter (DPF) 5, a low pressure EGR 6, a low pressure EGR cooler 7, a turbocharger 8, a high pressure EGR line 9, and a high pressure EGR cooler 10.

Such an engine system 1 may recycle some of the exhaust gas discharged through the exhaust line 4 from the exhaust manifold of the engine 3 to the intake line 2. The exemplary form of the present disclosure can be applied to a low pressure exhaust gas recirculation (LP-EGR) system for recycling exhaust gas after the DPF 5 to the intake line 2.

In the low pressure EGR system, a portion of the exhaust gas (low pressure EGR gas) and fresh air passing through the DPF 5 can be supplied to the intake manifold of the engine 3 through the turbocharger 8.

Here, as the intake air is compressed by the turbocharger 8, the temperature increases and expands, thereby lowering the oxygen density. In order to improve this, the intake line 2 is provided with an intercooler assembly 100 according to an exemplary form of the present disclosure for cooling the intake air to a set temperature.

The intercooler assembly 100 according to the exemplary form of the present disclosure cools (heat exchanges) the intake air supplied from the turbocharger 8 through the intake line 2. Then, the cooled intake air can be supplied to the intake manifold of the engine 3.

Hereinafter, regarding the mounting position of the intercooler assembly 100, an upper portion, an upper surface, a lower portion, and a lower surface are defined based on the drawing and thus depending on a viewing angle.

However, as the definition of the direction as a relative meaning, the direction may vary depending on the reference position of the intercooler assembly 100 and the like, and the reference direction is not necessarily limited to the reference direction of the present disclosure.

Furthermore, the following "end (one/one end or the other/one end)" may be defined as either end. And, it may be defined as a portion (one/one end or the other/one end) including the end thereof.

The intercooler assembly 100 according to an exemplary form of the present disclosure bypasses the intake air having a relatively high temperature to the intake air discharge side at a low temperature low load condition at winter startup, and has a structure capable of solving the condensate freezing problem at the intake air discharge side.

Figure 2:
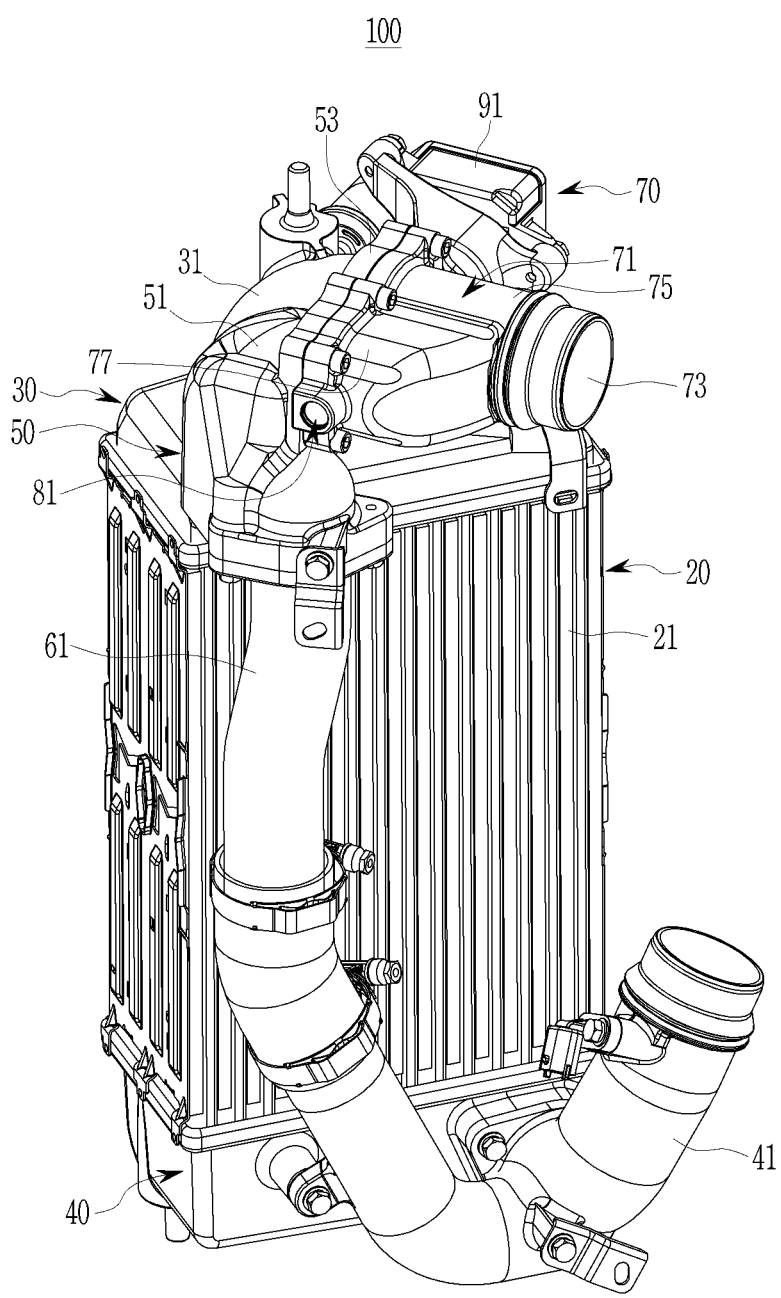
FIG. 2 and FIG. 3 are perspective views illustrating an intercooler assembly according to an exemplary form of the present disclosure.
Figure 3:
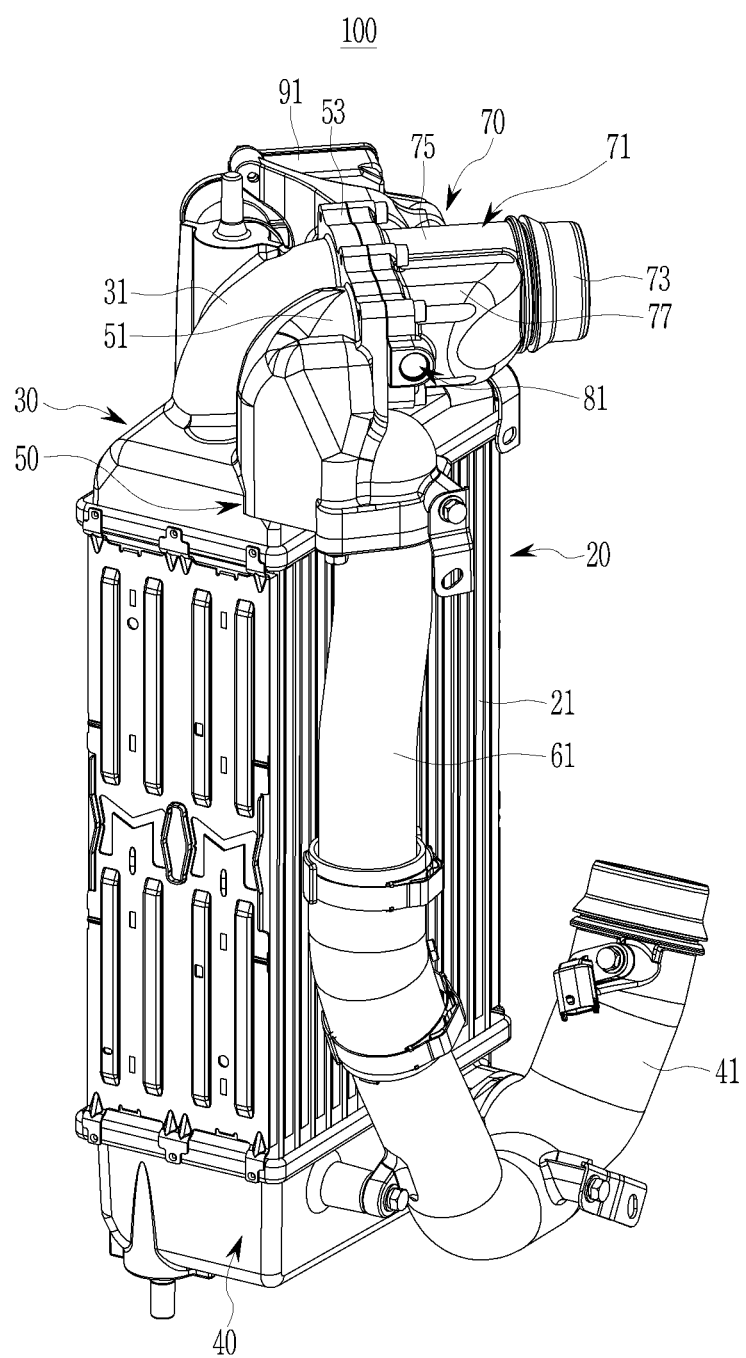

FIG. 2 and FIG. 3 are perspective views illustrating an intercooler assembly according to an exemplary form of the present disclosure.

Referring to FIG. 2 and FIG. 3, the intercooler assembly 100 includes: a cooler body 20, an upper tank 30, a lower tank 40, a bypass unit 50, and a valve unit 70.

In an exemplary form of the present disclosure, the cooler body 20 may include accessory elements such as brackets, plates, blocks, protrusions, ribs, etc. for installing various components to be described below.

The cooler body 20 includes a heat exchanger 21 for flowing intake air from the intake air inlet side to the intake air outlet side and cooling the intake air as cooling air. The heat exchange part 21 forms a set flow path through which intake air flows.

Since the heat exchanger 21 may be similar to a configuration of an air-cooled heat exchanger known in the art, a more detailed description of the configuration will be omitted.

In the exemplary form of the present disclosure, the upper tank 30 flows intake air supplied through the turbocharger 8 (see FIG. 1 below), and supplies the intake air to the heat exchange unit 21.

The upper tank 30 is coupled to the upper portion of the cooler body 20. The upper tank 30 forms an inner space connected to the upper end of the heat exchanger 21, and forms an intake air inlet 31 connected to the heat exchanger 21.

Figure 4:
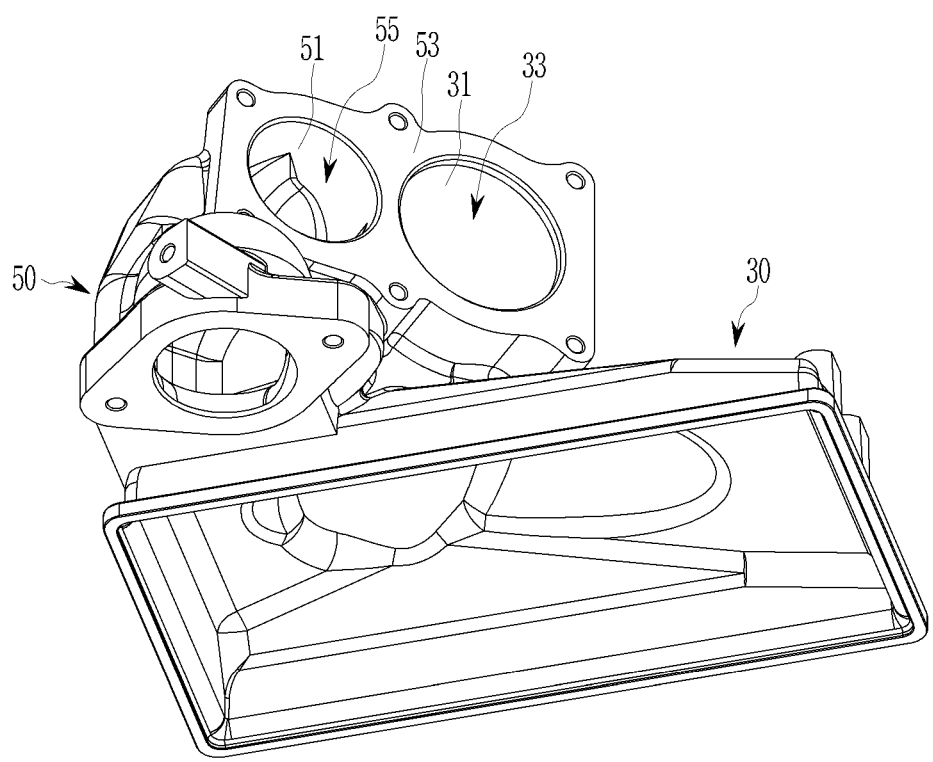
FIG. 4 is a view showing an upper tank portion applied to the intercooler assembly according to an exemplary form of the present disclosure.

The intake air inlet 31 is introduced into the heat exchanger 21 through the intake air supplied through the turbocharger 8, and is integrally provided at the upper portion of the upper tank 30. As shown in FIG. 4, the intake inlet 31 forms an intake inlet passage 33 having a set passage cross-sectional area.

In the exemplary form of the present disclosure, the lower tank 40 flows the heat exchanger 21 through the upper tank 30 and discharges the cooled intake air to the intake line 2 (see FIG. 1).

The lower tank 40 is coupled to the lower portion of the cooler body 20. The lower tank 40 forms an inner space connected to the lower end of the heat exchange part 21, and forms an intake air discharge part 41 connected to the heat exchange part 21.

The intake air discharge part 41 is provided to be connected to the inner space of the lower tank 40 at the lower portion of the lower tank 40. For example, the intake air discharge part 41 is provided in the form of a conduit pipe, and is disposed in an upward direction at the bottom of the lower tank 40.

In the exemplary form of the present disclosure, the bypass unit 50 does not flow into the heat exchanger 21 through the intake air inlet 31 from the intake air supplied from the turbocharger 8 to the upper tank 30. It is for bypassing the intake air discharge part 41 of the lower tank 40.

The bypass unit 50 is connected to the intake air discharge part 41 separately from the intake air inlet 31. The bypass unit 50 includes a bypass inlet 51 and a bypass conduit 61.

The bypass inlet 51 induces air supplied from the turbocharger 8 (i.e., air arrived near the intake inlet 31 from the turbocharger 8), and as illustrated in FIG. 4, the valve mounting unit 53 is located outside the upper tank 30 and is integrally formed with the intake air inlet 31.

The bypass inlet 51 forms a bypass passage 55 that is partitioned separately from the intake inlet passage 33 of the intake inlet 31. That is, the bypass inlet 51 forms the inlet of the bypass passage 55 connected to the outside of the upper tank 30, as compared with the intake inlet 31 which is connected to the internal space of the upper tank 30 by the intake inlet passage 33

Here, the bypass passage 55 of the bypass inlet 51 has a predetermined passage cross-sectional area which may be smaller than the passage cross-sectional area of the intake air inlet 31.

In addition, the bypass conduit 61 guides a flow of the intake air flowing into the bypass inlet 51 to the intake air discharge part 41. In one form, the bypass conduit 61 is in a form of a pipe conduit which connects the bypass inlet 51 and the intake air discharge part 41.

Figure 5:
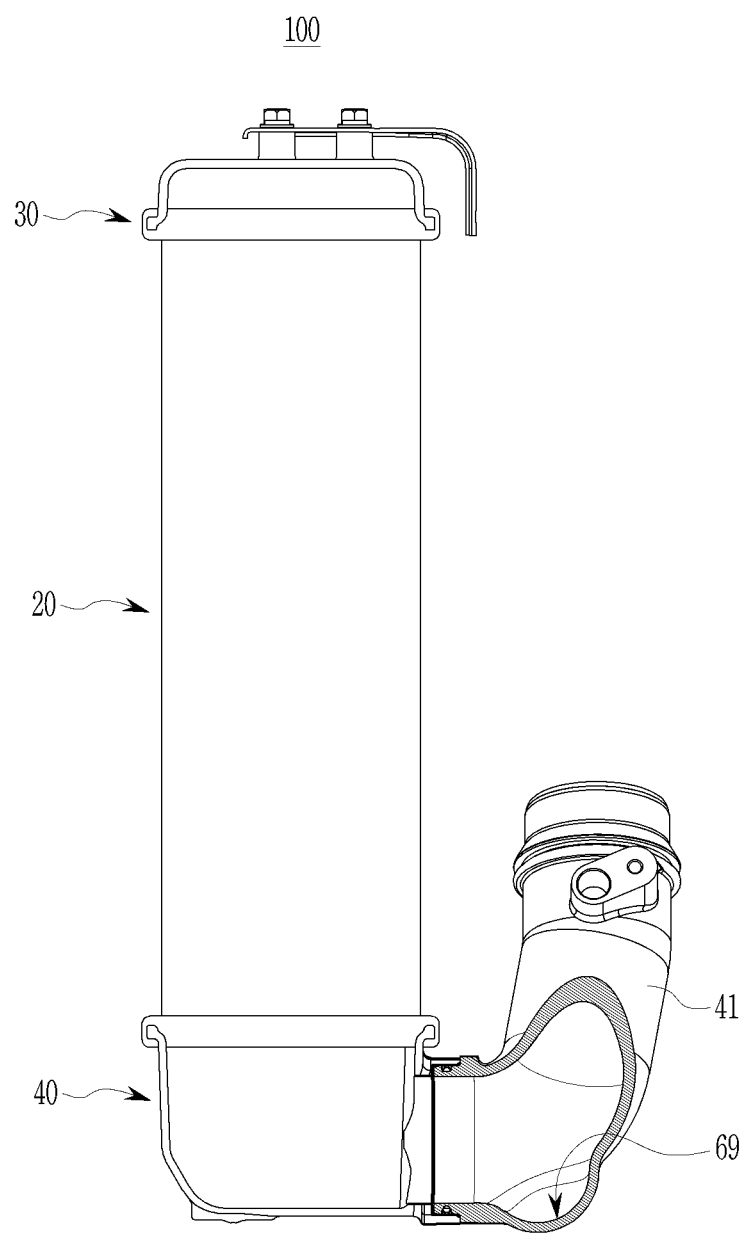
FIG. 5 is a partial cross-sectional view of the intercooler assembly according to an exemplary form of the present disclosure.

Furthermore, as shown in FIG. 5, the bypass conduit 61 includes a condensate collecting part 69 for collecting condensate at a connection end connected to the intake air discharge part 41.

In an exemplary form of the present disclosure, the valve unit 70 selectively flows the intake air supplied through the turbocharger 8 into the intake air inlet 31 and the bypass inlet 51 of the bypass unit 50.

Here, the valve unit 70 may close the bypass inlet 51 and open the intake air inlet 31 under high temperature and high load conditions. In addition, the valve unit 70 may open the bypass inlet 51 and close the intake inlet 31 under low temperature and low load conditions.

The high temperature/high load conditions (also referred to in the art as low flow/low pressure conditions) refer to general driving conditions of a vehicle. The low temperature/low load condition (also referred to in the art as high flow rate/high pressure condition) means winter starting condition.

Since such high temperature/high load conditions and low temperature/low load conditions are clearly classified according to the state of the vehicle, the high temperature/high load condition and the low temperature/low load condition are not limited to any specific numerical range in the exemplary form of the present disclosure.

Figure 6:
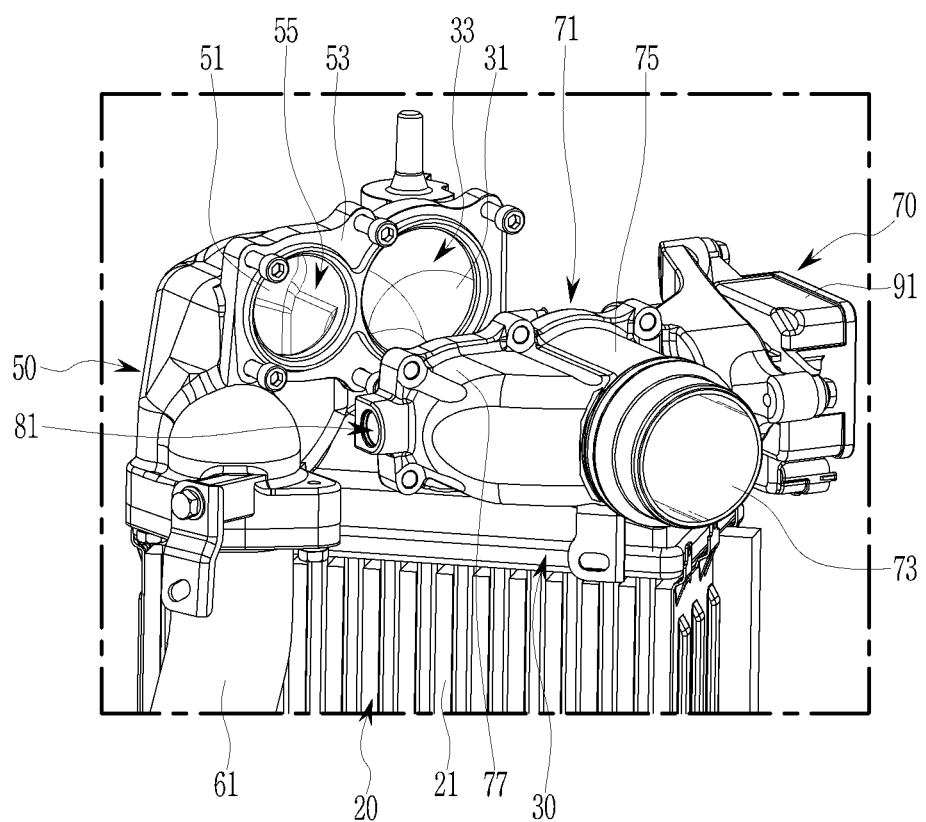
FIG. 6 to FIG. 8 are views respectively illustrating a valve unit applied to the intercooler assembly according to an exemplary form of the present disclosure.
Figure 7:
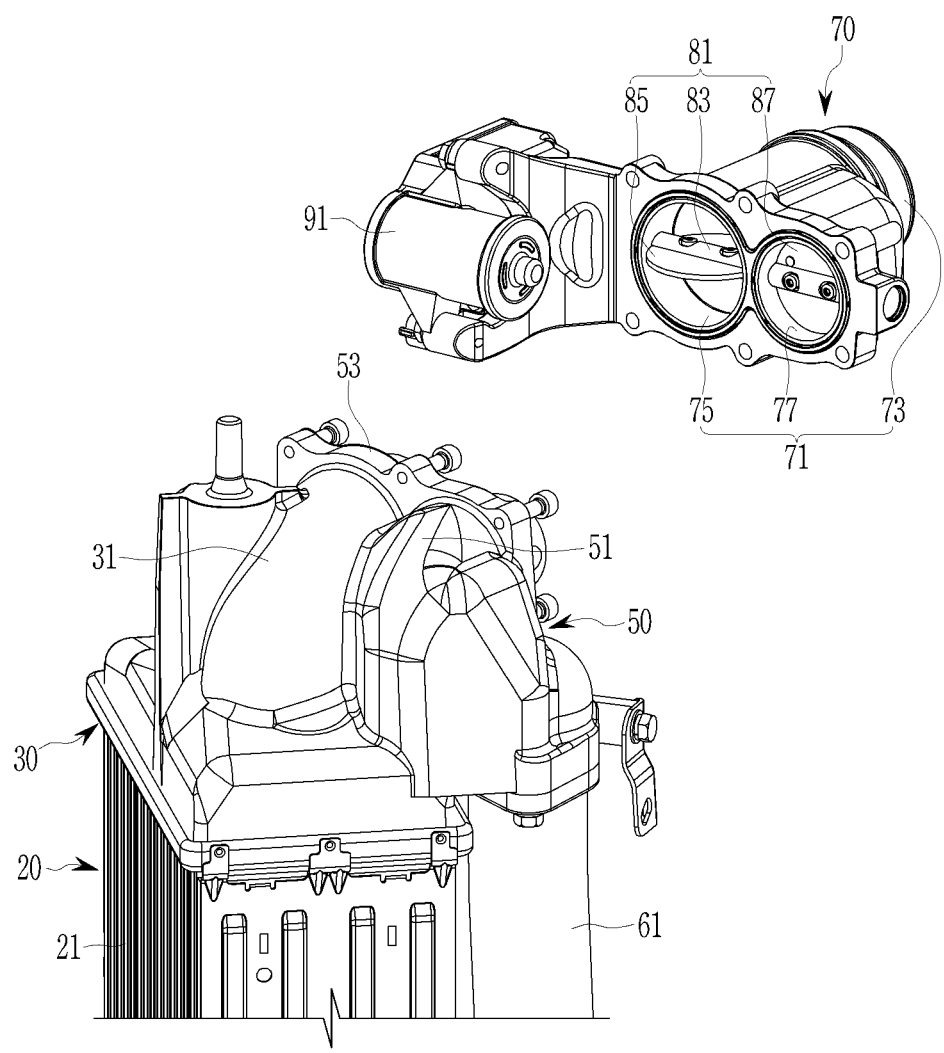
Figure 8:
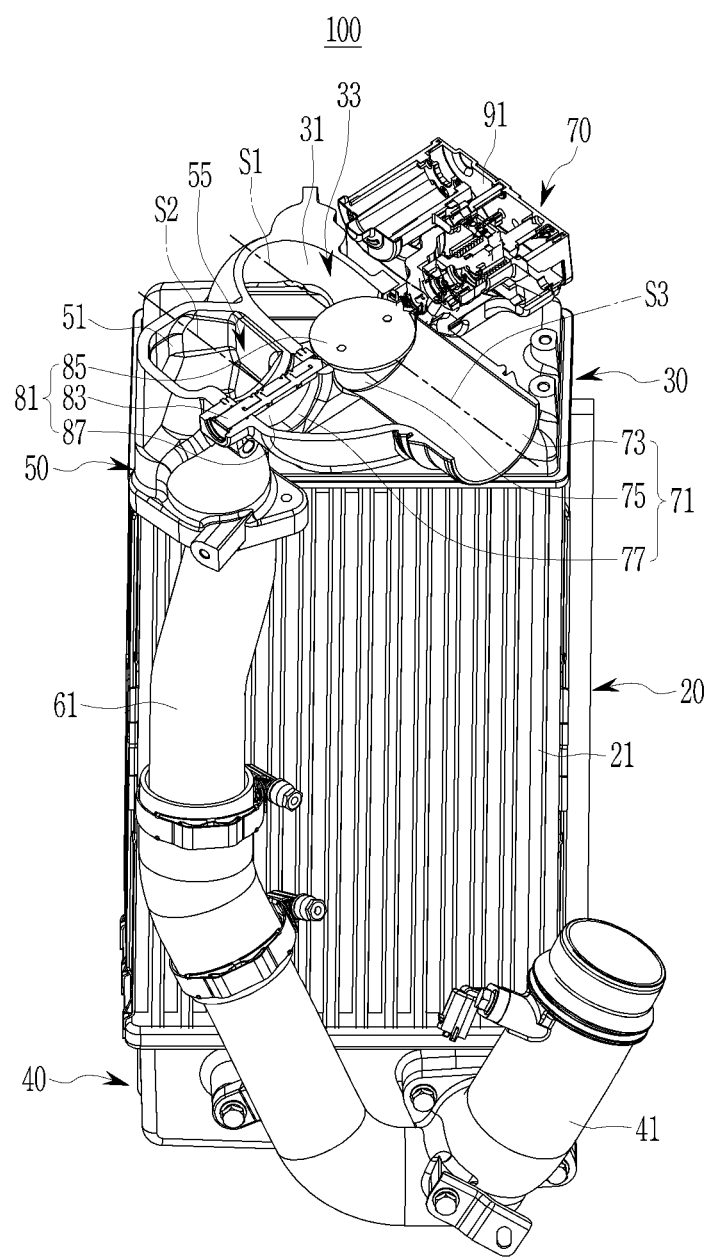

The valve unit 70 is installed to be connected to the intake air inlet 31 and the bypass inlet 51. This valve unit 70 includes a valve housing 71 and a valve body assembly 81, as shown in FIGS. 6 to 8.

The valve housing 71 is mounted to a valve mounting portion 53 that forms an intake air inlet 31 and a bypass inlet 51. The valve housing 71 forms a single main inlet 73 which is substantially connected to the intake air inlet 31 and the bypass inlet 51. The main inlet 73 flows intake air supplied from the turbocharger 8 toward the intake air inlet 31 and the bypass inlet 51.

The valve housing 71 includes a first valve passage portion 75 and a second valve passage portion 77 connected to one main inlet portion 73.

The first valve passage portion 75 has a set passage cross-sectional area and is connected to the intake air inlet portion 31. The second valve passage portion 77 has a passage cross-sectional area different from that of the first valve passage portion 75 and is connected to the bypass inlet portion 51. For example, the second valve passage portion 77 is formed with a passage cross-sectional area smaller than the passage cross-sectional area of the first valve passage portion 75.

Here, the central axis S1 of the first valve passage portion 75 is disposed closer to the central axis S3 of the main inlet portion 73 than the central axis S2 of the second valve passage portion 77.

The valve body assembly 81 is for selectively opening and closing the intake inlet passage 33 of the intake inlet 31 and the bypass passage 55 of the bypass inlet 51.

The valve body assembly 81 operates by receiving a driving force from the actuator 91. The actuator 91 is installed in the valve housing 71. For example, the actuator 91 may include a servo motor of a known technology capable of receiving servo control of a rotational speed and a rotational direction by receiving an electrical control signal from a controller (not shown).

This valve body assembly 81 includes a valve axis of rotation 83, a first valve body 85, and a second valve body 87.

The valve rotation shaft 83 is a single shaft, and is rotatably installed in the valve housing 71 by the actuator 91. The valve rotation shaft 83 crosses the first and second passage portions 75 and 77 and is installed to be connected to the actuator 91.

The first valve body 85 is installed to be fixed to the valve rotation shaft 83 in the first valve passage portion 75. In addition, the second valve body 87 is installed to be fixed to the valve rotation shaft 83 in the second valve passage portion 77.

Here, the first and second valve body 85 and 87 are provided in the form of a circular flap and may rotate with the valve rotation shaft about a rotation axis of the valve rotation shaft so as to open and close the first and second valve passage portion 75 and 77, respectively, and the valve rotation shaft 83 is fixed to intersect each other vertically in the coaxial direction.

Hereinafter, the operation of the intercooler assembly 100 according to the exemplary form of the present disclosure configured as described above will be described in detail with reference to the drawings and the accompanying drawings.

Figure 9:
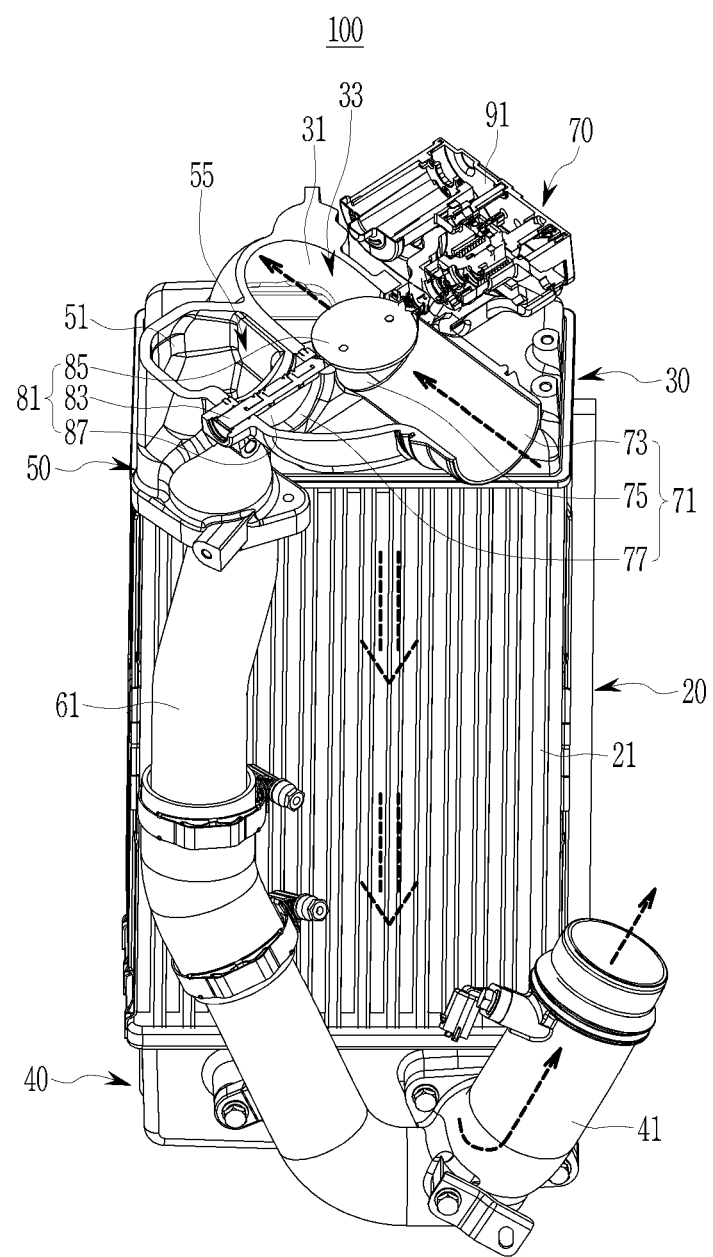
FIG. 9 and FIG. 10 are views for explaining the operation of the intercooler assembly according to an exemplary form of the present disclosure.
Figure 10:
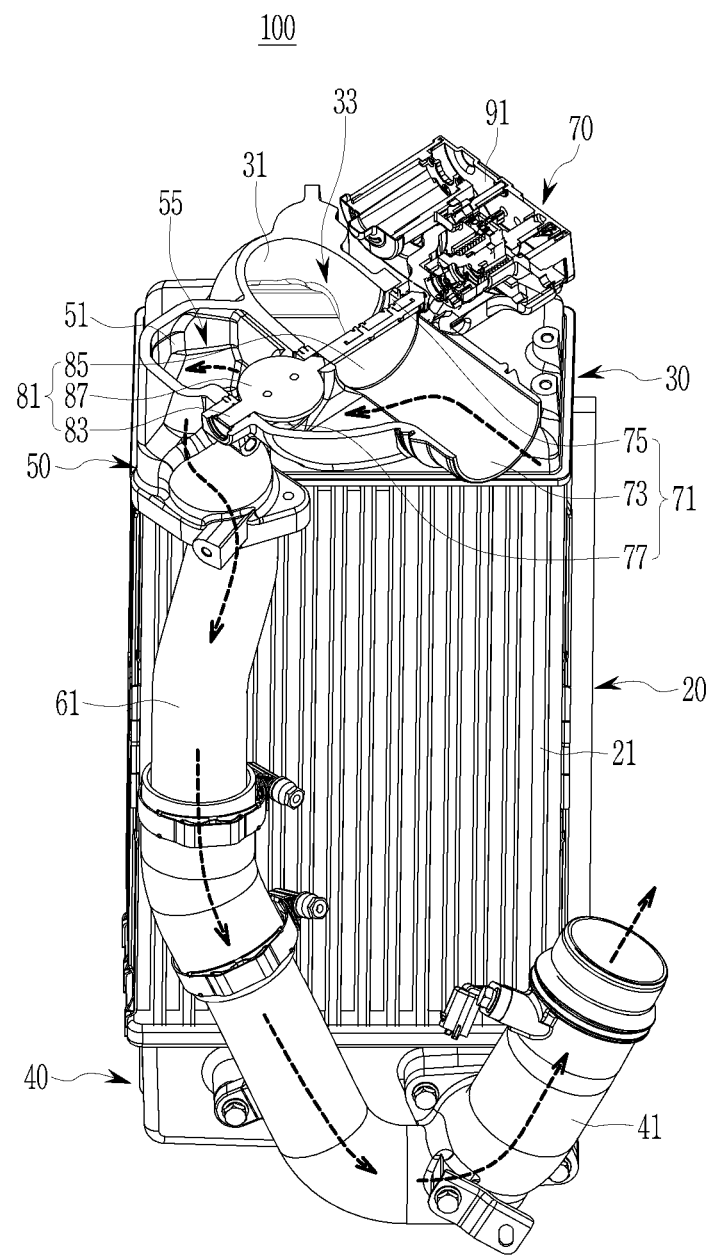

FIG. 9 and FIG. 10 are views for explaining the operation of the intercooler assembly according to an exemplary form of the present disclosure.

Referring to FIG. 9, first, according to the exemplary form of the present disclosure, in accordance with the rotation of the valve shaft 83 in accordance with the driving of the actuator 91 in the high temperature and high load conditions in the normal driving of the vehicle, the first valve passage portion 75 is opened through the first valve body 85, and the second valve passage portion 77 is closed through the second valve body 87.

Accordingly, the intake inlet passage 33 of the intake inlet portion 31 maintains a state of being interconnected with the main inlet portion 73 through the first valve passage portion 75, and bypasses the bypass inlet portion 51. The passage 55 remains closed by the second valve body 87.

In this state, in the form of the present disclosure, the low-pressure EZ gas and the intake (high temperature state) of the fresh air compressed in the turbocharger 8 are introduced into the main inlet 73 through the intake line 2.

Then, the high temperature intake air flows into the heat exchange part 21 through the internal space of the upper tank 30 while the intake air inflow path 33 of the intake air inlet part 31 flows in through the first valve passage part 75.

The intake air introduced into the heat exchange part 21 flows along the set flow path of the heat exchange part 21, and heat exchange is performed with the cooling air. It is discharged through the intake air discharge part 41. Therefore, the intake air is discharged through the intake air discharge part 41 and is supplied to the intake manifold of the engine 3 through the intake line 2.

In this process, in the exemplary form of the present disclosure, the second valve passage portion 77 has a passage cross section smaller than the passage cross section of the first valve passage portion 75. The central axis of the first valve passage portion 75 is disposed closer to the central axis of the main inflow portion 73 than the second valve passage portion 77. Therefore, the load acting on the valve rotating shaft 83 through the second valve body 87 by intake can be reduced.

Furthermore, in the exemplary form of the present disclosure, the condensed water may be generated while the saturated water vapor in the low-pressure EGR gas contained in the intake air is cooled. This condensate is collected in the condensate collector 69 of the bypass conduit 61. In addition, the suction pressure is sucked into the intake line 2 through the intake air discharge portion 41, and may flow into the intake manifold of the engine 3.

On the other hand, referring to FIG. 10, in the exemplary form of the present disclosure in the low-temperature low load conditions at the start of winter, the rotation through the first valve body 85 as the rotation of the valve shaft 83 in accordance with the drive of the actuator 91 The first valve passage portion 75 is closed, and the second valve passage portion 77 is opened through the second valve body 87.

Thus, the intake inlet passage 33 of the intake inlet portion 31 remains closed by the first valve body 85. In addition, the bypass passage 55 of the bypass inlet 51 maintains a state of being interconnected with the main inlet 73 through the second valve passage 77.

In this state, in the form of the present disclosure, the low-pressure EGR gas and the intake air of the new air in the turbocharger 8 are introduced into the main inlet 73 through the intake line 2.

Then, relatively high temperature intake air flows into the bypass passage 55 of the bypass inlet portion 51 through the second valve passage portion 77. Then, while flowing along the bypass conduit 61 is discharged through the intake air discharge portion 41. The intake air discharged through the intake air discharge portion 41 is supplied to the intake manifold of the engine 3 through the intake line 2.

Thus, in the exemplary form of the present disclosure, as the ice block of the condensate frozen on the discharge side of the intake air at the low temperature low load condition at the start-up of winter as the relatively high intake air intake, the crack of the intake flow path according to the freezing of the condensate or breakage can be prevented.

In the process as described above, in the form of the present disclosure, the second valve passage portion 77 has a passage cross-sectional area smaller than the passage cross-sectional area of the first valve passage portion 75, the center of the first valve passage portion 75 is disposed closer to the central axis of the main inlet 73 than the second valve passage 77. Therefore, the load acting on the valve rotating shaft 83 through the first valve body 85 by intake can be reduced.

On the other hand, in the exemplary form of the present disclosure, in the process of bypassing the intake air through the bypass unit 50 under low temperature low load conditions, the intake air containing the low pressure EGR gas is minutely introduced into the heat exchange part 21 through a gap between the first valve body 85 and the first valve passage part 75 through the intake air inlet part 31. Therefore, it is possible to generate condensed water while cooling saturated steam in the low-pressure EGR gas.

This condensate is collected in the condensate collector 69 of the bypass conduit 61, and the condensate is sucked into the intake line 2 through the intake air discharge portion 41 by the boost pressure and may flow into the intake manifold of the engine 3.

If the condensate collected by the condensate collecting unit 69 does not flow into the intake manifold of the engine 3 and is frozen under low temperature and low load conditions, the ice block of the condensate is melted as relatively high temperature intake and intakes the melted condensate. Through the intake air discharge portion 41 may be introduced into the intake line 2.

According to the intercooler assembly 100 according to the exemplary form of the present disclosure as described above, the intake air flows to the heat exchange unit 21 by the operation of the valve unit 70 under high temperature and high load conditions during normal driving of the vehicle.

In addition, according to the exemplary form of the present disclosure, the intake air may be bypassed to the intake air discharge part 41 through the bypass unit 50 by the operation of the valve unit 70 at a low temperature low load condition at the start of winter.

Accordingly, in the form of the present disclosure, it is possible to prevent the increase in the differential pressure, the intercooler performance, and the damage or breakage of the intake flow path due to the freezing of the condensate at low temperature and low load conditions at the start of winter.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

| <Description of symbols> | |
|---|---|
| 1: engine system | 2: intake line |
| 3: engine | 4: exhaust line |
| 5: DPF | 6: low pressure EGR line |
| 7: low pressure EGR cooler | 8: turbocharger |
| 9: high pressure EGR line | 10: high pressure EGR cooler |
| 20: cooler main body | 21: heat exchanger |
| 30: upper tank | 31: intake inflow portion |
| 33: intake inflow passage | 40: lower tank |
| 41: intake air discharge portion | 50: bypass unit |
| 51: bypass inflow portion | 53: valve mount portion |
| 55: bypass passage | 61: bypass conduit |
| 69: condensate collector | 70: valve unit |
| 71: valve housing | 73: main inflow portion |
| 75: first valve passage portion | 77: second valve passage portion |
| 81: valve body assembly | 83: valve rotation shaft |
| 85: first valve body | 87: second valve body |
| 91: actuator | 100: intercooler assembly |

What is claimed is:

1. An intercooler assembly, comprising:
a cooler body having a heat exchanger;
an upper tank formed at an intake air inlet connected to the heat exchanger and coupled to an upper portion of the cooler body;
a lower tank coupled to a lower portion of the cooler body to form an intake air discharge part connected to the heat exchanger;
a bypass inlet unit which is integrally provided with an intake inlet unit through a valve mounting unit located outside of the upper tank and configured to form a passage partitioned separately from a passage of the intake inlet unit;
a bypass conduit configured to connect the bypass inlet and the intake air discharge part;
a valve housing having a main inlet connected to an intake inlet and the bypass inlet and mounted to the valve mounting unit; and
a valve body assembly installed in the valve housing and configured to selectively open and close a passage of the intake inlet and the bypass inlet by a driving force from an actuator,
wherein the valve housing is configured to form a first valve passage portion and a second valve passage portion connected to one main inlet portion,
wherein the valve body assembly includes:
a valve rotation shaft configured to traverse the first and second valve passage portions and connected to the actuator;
a first valve body fixed at a first location on the valve rotation shaft in the first valve passage portion; and
a second valve body fixed at a second location on the valve rotation shaft in the second valve passage portion, wherein the first location is spaced apart from the second location, and
wherein the first and second valve bodies are respectively provided in a form of a circular flap, and flat surfaces of the circular flaps of the first and second valve bodies are arranged to be perpendicular to each other, such that the flat surfaces of the circular flaps of the first and second valve bodies rotate together with the valve rotation shaft and respectively close or open the first and second valve passage portions at different rotation angles about a rotation axis of the valve rotation shaft.

2. The intercooler assembly of claim 1, wherein:
the first valve passage portion has a predetermined passage cross-sectional area and is connected with the intake air inlet, and
the second valve passage portion has a passage cross-sectional area different from the passage cross-sectional area of the first valve passage portion and is connected to the bypass inlet.

3. The intercooler assembly of claim 2, wherein:
the passage cross-sectional area of the second valve passage portion is smaller than the passage cross-sectional area of the first valve passage portion.

4. The intercooler assembly of claim 2, wherein:
a central axis of the first valve passage portion is disposed closer to a central axis of the main inlet portion than the second valve passage portion.

5. The intercooler assembly of claim 1, wherein the bypass conduit includes a condensate collector at a connection end connected to the intake air discharge part.

* * * * *